(12) United States Patent
Johnson

(10) Patent No.: US 11,904,768 B2
(45) Date of Patent: Feb. 20, 2024

(54) CABIN LIGHT AND CABIN LIGHT ASSEMBLY FOR MACHINE

(71) Applicant: Caterpillar Inc., Peoria, IL (US)

(72) Inventor: Terril James Johnson, Washington, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 17/654,636

(22) Filed: Mar. 14, 2022

(65) Prior Publication Data
US 2023/0286434 A1  Sep. 14, 2023

(51) Int. Cl.
| | |
|---|---|
| *B60Q 3/51* | (2017.01) |
| *B60Q 3/82* | (2017.01) |
| *B60Q 3/74* | (2017.01) |
| *B60Q 3/43* | (2017.01) |
| *B60Q 3/85* | (2017.01) |
| *F21V 23/04* | (2006.01) |
| *B64D 11/00* | (2006.01) |

(52) U.S. Cl.
CPC .............. *B60Q 3/51* (2017.02); *B60Q 3/43* (2017.02); *B60Q 3/74* (2017.02); *B60Q 3/82* (2017.02); *B60Q 3/85* (2017.02); *B64D 2011/0053* (2013.01); *F21V 23/04* (2013.01)

(58) Field of Classification Search
CPC ... B60Q 3/43; B60Q 3/51; B60Q 3/74; B60Q 3/82; B60Q 3/85; B64D 2011/0053; F21V 23/04
USPC .................................................. D26/28, 72
See application file for complete search history.

(56) References Cited

U.S. PATENT DOCUMENTS

| | | | | |
|---|---|---|---|---|
| 4,930,056 | A | * | 5/1990 | Stephenson ............. F21V 17/16 362/147 |
| D315,216 | S | * | 3/1991 | Kelley .......................... D26/72 |
| 5,003,449 | A | * | 3/1991 | Stephenson ............... F21S 8/04 362/346 |

(Continued)

FOREIGN PATENT DOCUMENTS

| | | | |
|---|---|---|---|
| CN | 213901016 U | * | 8/2021 |
| GB | 2553337 | | 3/2018 |

(Continued)

OTHER PUBLICATIONS

Machine translation of CN 213901016 U retrieved from the FIT database of PE2E search. (Year: 2023).*

(Continued)

*Primary Examiner* — Colin J Cattanach

(57) ABSTRACT

A cabin light includes a panel coupled with a light source. The panel includes a pair of longitudinal portions extending along a longitudinal axis of the cabin light, a first lateral portion extending between the longitudinal portions along a lateral axis of the cabin light, and a second lateral portion extending between the longitudinal portions along the lateral axis. Each longitudinal portion includes a first surface and a second surface disposed at an offset from the first surface. The first lateral portion defines a first length and includes a first raised surface. The second lateral portion defines a second length, and includes a second raised surface. The cabin light also includes cover in alignment with the light source. The cabin light further includes a switch disposed between the cover and the second lateral portion.

17 Claims, 7 Drawing Sheets

(56) References Cited

U.S. PATENT DOCUMENTS

| | | | | |
|---|---|---|---|---|
| 6,056,423 A | * | 5/2000 | Takano | B60Q 3/51 |
| | | | | 362/490 |
| 2005/0136708 A1 | * | 6/2005 | Shimoda | H05K 3/202 |
| | | | | 439/76.2 |
| 2005/0258023 A1 | * | 11/2005 | Nagai | B60Q 3/51 |
| | | | | 200/339 |
| 2010/0127525 A1 | | 5/2010 | Dassen | |
| 2014/0029286 A1 | * | 1/2014 | Suzuki | B60Q 3/82 |
| | | | | 362/520 |
| 2015/0353005 A1 | | 12/2015 | Hodgson et al. | |

FOREIGN PATENT DOCUMENTS

| | | | | |
|---|---|---|---|---|
| JP | 4930220 B2 | | 5/2012 | |
| JP | 5130118 B2 | | 1/2013 | |
| WO | WO-2021013620 A1 | * | 1/2021 | ......... B29C 45/1418 |

OTHER PUBLICATIONS

Machine translation of WO 2021013620 A1 retrieved from the FIT database of PE2E search. (Year: 2023).*

Extended European Search Report for EP Patent Appln. No. 23157659.6, dated Jul. 3, 2023 (9 pgs).

* cited by examiner

CABIN LIGHT AND CABIN LIGHT ASSEMBLY FOR MACHINE

TECHNICAL FIELD

The present disclosure relates to a cabin light and a cabin light assembly for a machine.

BACKGROUND

A machine, such as a wheel loader, includes an operator cabin supported by a frame of the machine. The operator cabin may include one or more controls, such as, joysticks, pedals, levers, buttons, switches, knobs, audio visual devices, operator consoles, a steering wheel, and the like. The operator cabin further includes a lighting assembly to provide illumination within the operator cabin. Different types of operator cabins may have different mounting arrangements for receiving the light assembly. For example, some operator cabins may have a mounting arrangement that can be coupled with a larger sized light assembly, whereas some operator cabins may have a mounting arrangement that can be coupled with a smaller sized light assembly. It may not be feasible to manufacture light assemblies having different designs and sizes, as per the design of the operator cabin or the mounting arrangements, as such an approach may increase part numbers associated with the light assemblies. Further, conventional lighting assemblies may lack aesthetics and may not provide a modular light assembly that can be coupled with different operator cabins or mounting arrangements.

GB2553337A describes a dome light assembly for a vehicle, suitable for a vehicle, comprising a lighting arrangement. The lighting arrangement comprises a first lighting device for providing direct illumination of an interior of the vehicle and wherein the lighting arrangement further comprises a translucent optical element covering the first lighting device. To provide a dome light assembly of this kind, by means of which dome light assembly an improved, consistent and especially relaxing illumination of an interior of a vehicle can be achieved, the lighting arrangement further comprises a second lighting device comprising a light source and an optical waveguide coupled to the light source and arranged to provide ambient illumination of the interior of the vehicle. The light assembly may be in a ribbon shape and may comprise two parallel optical waveguides extending along a respective side of the lighting element. The device may comprise more than one lighting device and at least two may about each other to form a single continuous waveguide.

SUMMARY OF THE DISCLOSURE

In an aspect of the present disclosure, a cabin light for a machine is provided. The cabin light includes a panel adapted to couple with a light source. The panel includes a pair of longitudinal portions extending along a longitudinal axis of the cabin light. Each longitudinal portion includes a first surface, a second surface disposed at an offset from the first surface, and a first width. The first surface defines a second width, such that the first width is greater than the second width by a factor of at least two. The panel also includes a first lateral portion extending between the pair of longitudinal portions along a lateral axis of the cabin light. The first lateral portion defines a first length along the longitudinal axis. The first lateral portion includes a first raised surface extending along at least a portion of the first length. The panel further includes a second lateral portion extending between the pair of longitudinal portions along the lateral axis of the cabin light. The second lateral portion is disposed opposite the first lateral portion. The second lateral portion defines a second length along the longitudinal axis. The second lateral portion includes a second raised surface extending along at least a portion of the second length. The cabin light also includes a cover fixedly coupled to the panel. The cover is in alignment with the light source, such that the cover allows passage of light emitted by the light source therethrough. The cabin light further includes a switch disposed between the cover and the second lateral portion of the panel.

In another aspect of the present disclosure, a cabin light assembly for a machine is provided. The cabin light assembly includes a cabin light including a panel adapted to couple with a light source. The panel includes a pair of longitudinal portions extending along a longitudinal axis of the cabin light. Each longitudinal portion includes a first surface, a second surface disposed at an offset from the first surface, and a first width. The first surface defines a second width, such that the first width is greater than the second width by a factor of at least two. The panel also includes a first lateral portion extending between the pair of longitudinal portions along a lateral axis of the cabin light. The first lateral portion defines a first length along the longitudinal axis. The first lateral portion includes a first raised surface extending along at least a portion of the first length. The panel further includes a second lateral portion extending between the pair of longitudinal portions along the lateral axis of the cabin light. The second lateral portion is disposed opposite the first lateral portion. The second lateral portion defines a second length along the longitudinal axis. The second lateral portion includes a second raised surface extending along at least a portion of the second length. The cabin light also includes a cover fixedly coupled to the panel. The cover is in alignment with the light source, such that the cover allows passage of light emitted by the light source therethrough. The cabin light further includes a switch disposed between the cover and the second lateral portion of the panel. The cabin light assembly also includes an adapter adapted to be removably coupled with an operator cabin of the machine. The cabin light is adapted to be removably coupled with the adapter. The adapter includes a first continuous surface extending along an outer perimeter of the adapter. The adapter also includes a second continuous surface extending along an inner perimeter of the adapter. The first continuous surface is spaced apart from the second continuous surface. The adapter defines a. central opening that at least partially receives the cabin light based on a coupling of the cabin light with the adapter. The panel is adapted to contact the second continuous surface based on the coupling of the cabin light with the adapter.

Other features and aspects of this disclosure will be apparent from the following description and the accompanying drawings.

DETAILED DESCRIPTION

Figure 1:
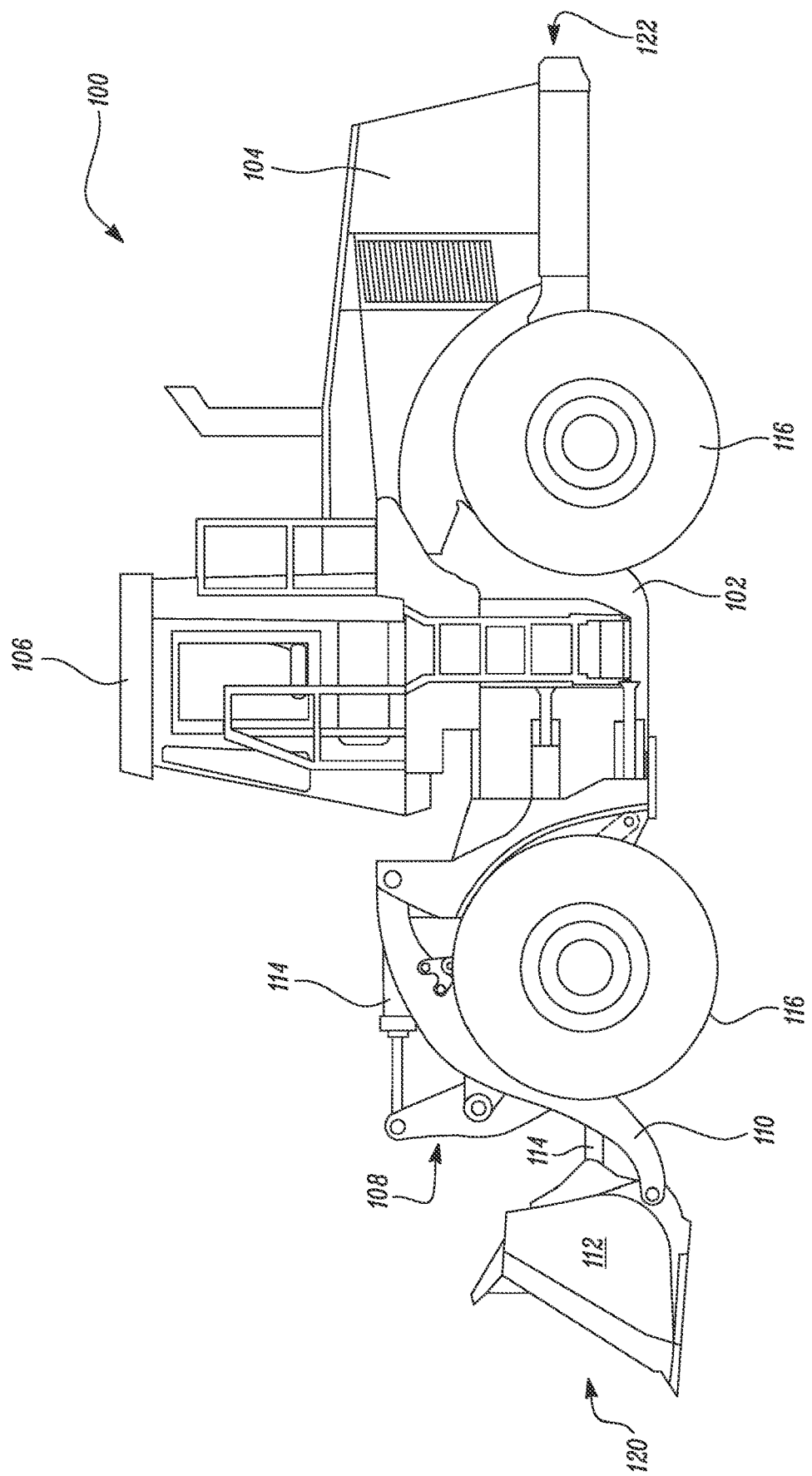
FIG. 1 is a side view of a machine, according to an embodiment of the present disclosure.

Wherever possible, the same reference numbers will be used throughout the drawings to refer to the same or like parts. Referring to FIG. 1, a side view of an exemplary machine 100 is illustrated. The machine 100 may be used for purposes, such as, construction, mining, landscaping, agriculture, and the like. The machine 100 is embodied as a wheel loader. Alternatively, the machine 100 may be embodied as an off highway truck, a dozer, an excavator, a tractor, a motor grader, a scraper, etc. that may be used in various industries to move, remove, or load materials, such as, asphalt, debris, dirt, snow, feed, gravel, logs, raw minerals, recycled material, rock, sand, woodchips, etc.

The machine 100 includes a frame 102 having a front end 120 and a rear end 122 opposite to the front end 120. The frame 102 supports various components of the machine 100, such as a power source (not shown), thereon. The power source may include an engine, such as an internal combustion engine, batteries, motors, and the like. The power source provides power to the machine 100 for operational and mobility requirements.

The machine 100 further includes a hood 104 proximate to the rear end 122 of the frame 102. The hood 104 encloses the power source therein. The machine 100 also includes a linkage assembly 108 movably coupled to the frame 102. The linkage assembly 108 is disposed proximate to the front end 120 of the machine 100. The linkage assembly 108 includes an arm 110 movably coupled to the frame 102. Further, the machine 100 includes a work implement 112 movably coupled to the arm 110 of the linkage assembly 108. The work implement 112 may be used to perform one or more work operations, such as, material loading, stock piling, dumping, and the like. The linkage assembly 108 also includes one or more actuators 114 (only two of which are illustrated in FIG. 1) to effectuate a movement of the work implement 112. The machine 100 further includes a number of wheels 116. The wheels 116 provide support and mobility to the machine 100 on grounds.

The machine 100 further includes an operator cabin 106 supported by the frame 102. The operator cabin 106 includes one or more controls (not shown), such as, joysticks, pedals, levers, buttons, switches, knobs, audio visual devices, operator consoles, a steering wheel, and the like. The controls may enable an operator to control the machine 100 during work operations. The operator of the machine 100 may sit or stand within the operator cabin 106 to perform the work operations. Further, the operator cabin 106 includes a cabin light 200 (shown in FIGS. 2 to 5) that provides illumination within the operator cabin 106. The cabin light 200 may be affixed below a headliner, which in turn covers an underside of a ceiling of the operator cabin 106. In some examples, the cabin light 200 may form a part of a cabin light assembly 150 (shown in FIG. 7). Specifically, the cabin light assembly 150 includes the cabin light 200. The cabin light assembly 150 also includes an adapter 300 (shown in FIGS. 6 and 7). The cabin light 200 may be removably coupled with the adapter 300. The adapter 300 will be described in detail later in this section with reference to FIGS. 6 and 7.

Figure 2:
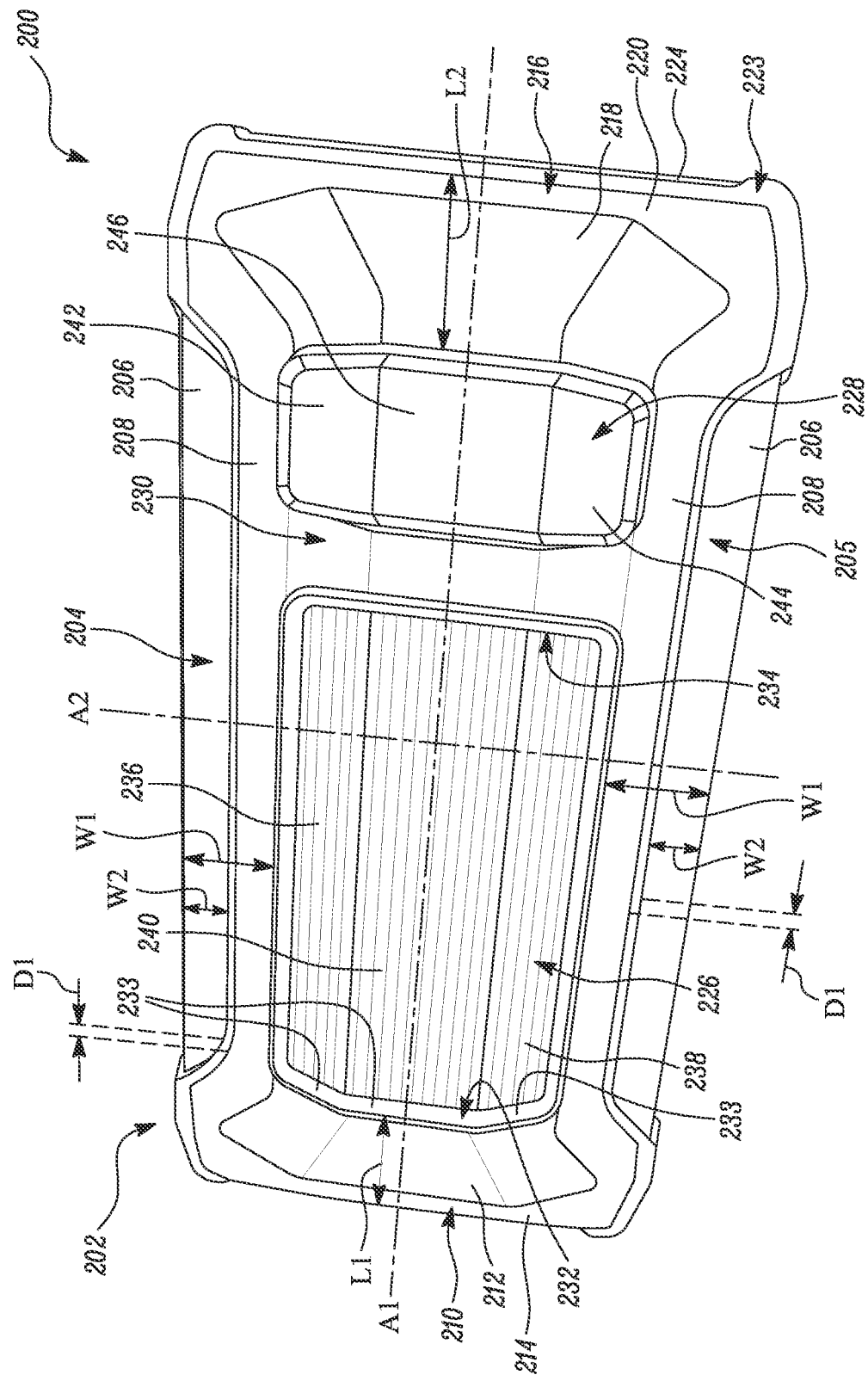
FIG. 2 is a perspective view of a cabin light associated with the machine of FIG. 1, according to an embodiment of the present disclosure.

Referring to FIG. 2, a perspective view of the cabin light 200 associated with the machine 100 is illustrated, in accordance with an embodiment of the present disclosure. The cabin light 200 defines a longitudinal axis "A1" and a lateral axis "A2" orthogonal to the longitudinal axis "A1". The cabin light 200 includes a panel 202 that couples with a light source 201 (schematically shown in FIG. 5). The cabin light 200 also includes a cover 226 and a switch 228.

Further, the panel 202 includes a pair of longitudinal portions 204, 205 extending along the longitudinal axis "A1" of the cabin light 200. Each longitudinal portion 204, 205 includes a first surface 206, a second surface 208 disposed at an offset "D1" from the first surface 206, and a first width "W1". In other words, the second surface 208 is spaced apart from the first surface 206 by the offset "D1". Further, the first surface 206 defines a second width "W2", such that the first width "W1" is greater than the second width "W2" by a factor of at least two. However, in some examples, the first width "W1" may be greater than the second width "W2" by a factor of at least 2,5, at least 3, at least 3.5, or at least 4, without any limitations. In other examples, the first width "W1" may be greater than the second width "W2" by a factor of at least 1, at least 1.5, and the like, without any limitations.

The panel 202 further includes a first lateral portion 210 extending between the pair of longitudinal portions 204, 205 along the lateral axis "A2" of the cabin light 200. The first lateral portion 210 defines a first length "L1" along the longitudinal axis "A1". Further, the first lateral portion 210 includes a first raised surface 212 extending along a portion of the first length "L1". The first raised surface 212 may have a gradually varying height. In some examples, the first raised surface 212 may extend along more than half of the first length "L1". The first lateral portion 210 further defines a first planar surface 214. The first planar surface 214 and the first raised surface 212 are disposed adjacent to each other. The first planar surface 214 defines a height "H1". Further, the first raised surface 212 defines a maximum height "H2", such that the maximum height "H2" is greater than the height "H1".

The panel 202 further includes a second lateral portion 216 extending between the pair of longitudinal portions 204, 205 along the lateral axis "A2" of the cabin light 200. The second lateral portion 216 is disposed opposite the first lateral portion 210. The second lateral portion 216 defines a second length "L2" along the longitudinal axis "A1". The second lateral portion 216 includes a second raised surface 218 extending along a portion of the second length "1,2". The second raised surface 218 may have a gradually varying height. In some examples, the second raised surface 218 may extend along more than half of the second length "1,2". The second lateral portion 216 further defines a second planar surface 220. The second planar surface 220 and the second raised surface 218 are disposed adjacent to each other. The second planar surface 220 defines a height "H3". Further, the second raised surface 218 defines a maximum height "H4", such that the maximum height "H4" is greater than the height "H3". In some examples, the height "H1" of the first planar surface 214 may be substantially similar to the height "H3" of the second planar surface 220. In some examples, the maximum height "H2" of the first raised surface 212 may be substantially similar to the maximum height "H4" of the second raised surface 218.

Further, each of the first and second raised surfaces 212, 218 include a number of surface portions extending along the longitudinal axis "A1". The surface portions of the each of the first and second raised surfaces 212, 218 may be parallel to each other. In the illustrated example of FIG. 2, each of the first and second raised surfaces 212, 218 includes three surface portions, without any limitation.

Further, the panel 202 includes an intermediate portion 230 disposed between the cover 226 and the switch 228. The intermediate portion 230 further includes three surface portions that are parallel to each other and extend along the longitudinal axis "A1", In some examples, each of the three surface portions of the intermediate portion 230 may be substantially planar.

Figure 3B:
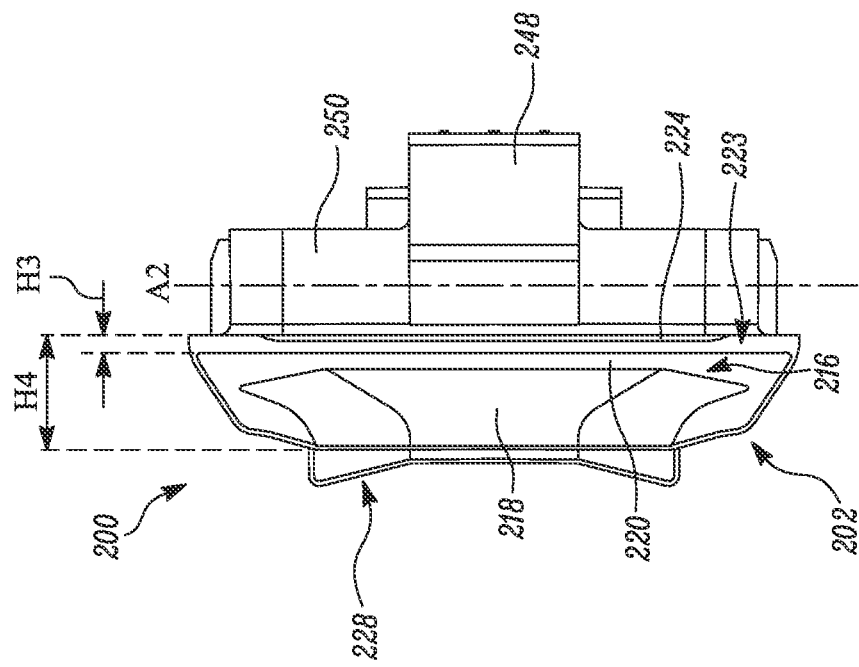
FIGS. 3A and 3B are side views of the cabin light of FIG. 2.
Figure 3A:
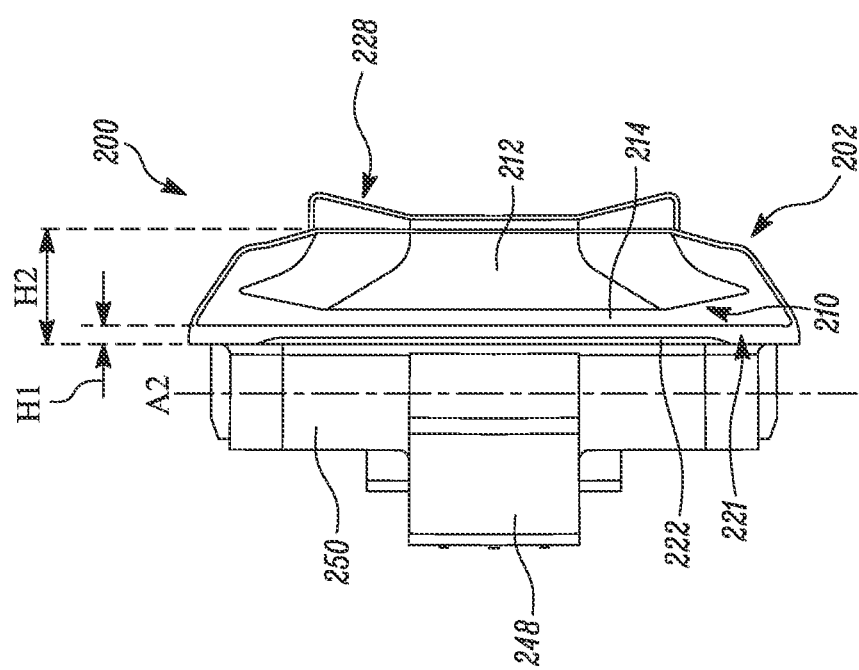

Referring to FIG. 3A, the panel 202 also includes a first side portion 221 extending orthogonally from the first lateral portion 210. The first side portion 221 extends along the lateral axis "A2" between the pair of longitudinal portions 204, 205. Further, the panel 202 includes a first side surface 222 orthogonal to the first lateral portion 210. The first side surface 222 forms a part of the first side portion 221.

Referring now to FIG. 3B, the panel 202 also includes a second side portion 223 extending orthogonally from the second lateral portion 216. The second side portion 223 is substantially parallel to the first side portion 221. The second side portion 223 extends along the lateral axis "A2" between the pair of longitudinal portions 204, 205. Further, the panel 202 includes a second side surface 224 orthogonal to the second lateral portion 216, such that the first side surface 222 is substantially parallel to the second side surface 224. The second side surface 224 forms a part of the second side portion 223. Further, each of the first side surface 222 and the second side surface 224 includes a polished surface finish.

Figure 4:
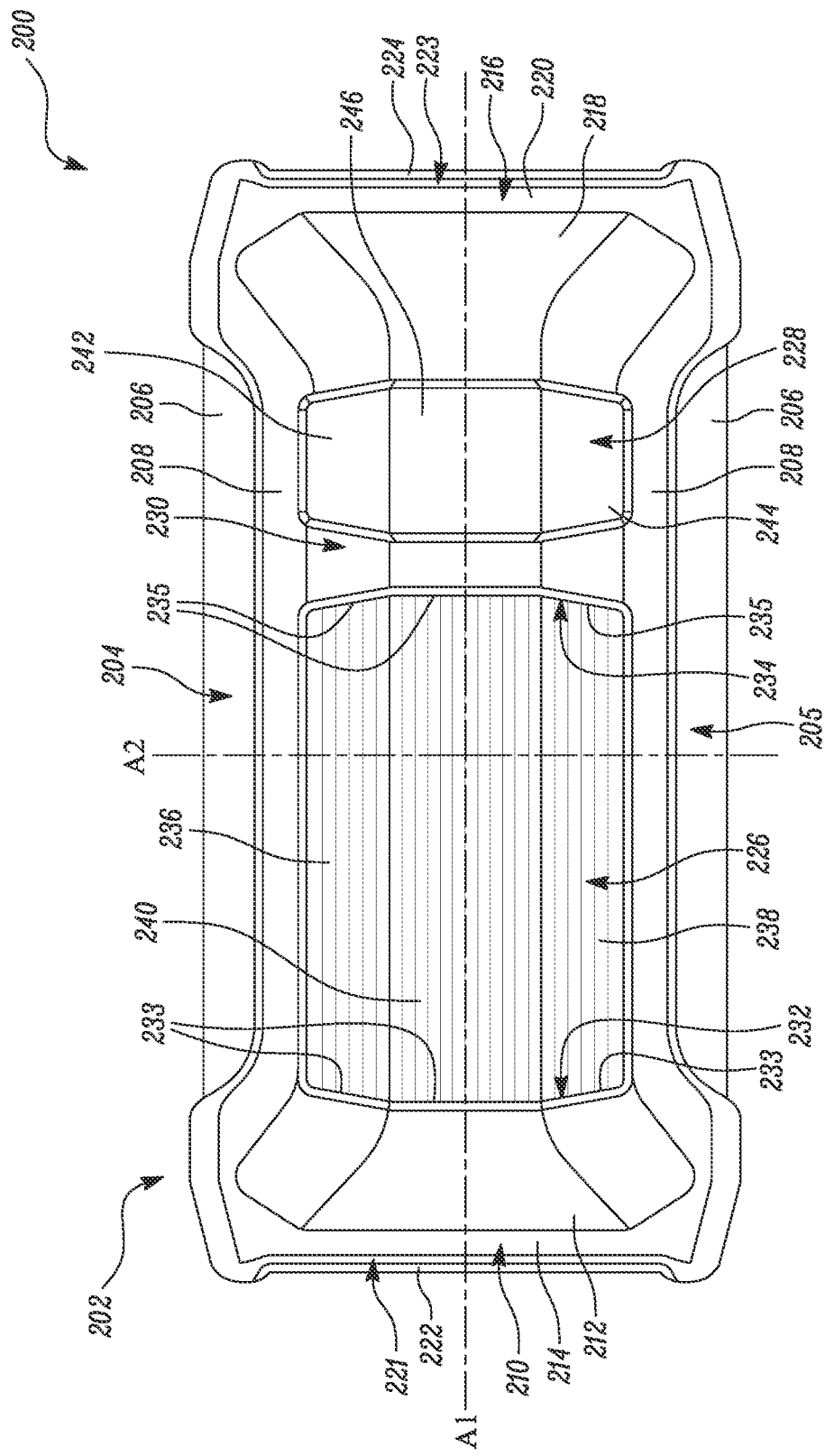
FIG. 4 is a front view of the cabin light of FIG. 2.

Referring now to FIG. 4, the panel 202 includes the cover 226 fixedly coupled to the panel 202. The cover 226 is in alignment with the light source 201 (see FIG. 5), such that the cover 226 allows passage of light emitted by the light source 201 therethrough. The cover 226 extends between the first lateral portion 210 and the intermediate portion 230. In some examples, the cover 226 may be made of a translucent material. The cover 226 defines a first side 232 extending along the lateral axis "A2" and disposed adjacent to the first raised surface 212 of the first lateral portion 210, such that the first side 232 includes a number of first linear surfaces 233. In the illustrated example of FIG. 4, the first side 232 includes three first linear surfaces 233. The cover 226 further defines a second side 234 extending along the lateral axis "A2" and disposed adjacent to the intermediate portion 230, such that the second side 234 includes a number of second linear surfaces 235. In the illustrated example of FIG. 4, the second side 234 includes three second linear surfaces 235.

Further, the cover 226 includes a first cover surface 236, a second cover surface 238, and a third cover surface 240 disposed between the first cover surface 236 and the second cover surface 238. Each of the first, second, and third cover surfaces 236, 238, 240 extends from the first side 232 to the second side 234. Further, each of the first cover surface 236 and the second cover surface 238 is inclined with respect to the third cover surface 240. Moreover, each of the first, second, and third cover surfaces 236, 238, 240 may be substantially planar. In some examples, the first, second, and third cover surfaces 236, 238, 240 may have a lenticular-like design, such that the cover 226 may hide/mask the hardware present behind the cover 226.

The panel 202 further includes the switch 228 disposed between the cover 226 and the second lateral portion 216 of the panel 202. Specifically, the switch 228 is disposed between the intermediate portion 230 and the second lateral portion 216. The switch 228 includes a first switch surface 242, a second switch surface 244, and a third switch surface 246 extending between the first switch surface 242 and the second switch surface 244. Each of the first switch surface 242 and the second switch surface 244 is inclined with respect to the third switch surface 246. As illustrated in FIG. 4, the first cover surface 236 is in alignment with the first switch surface 242, the second cover surface 238 is in alignment with the second switch surface 244, and the third cover surface 240 is in alignment with the third switch surface 246.

Further, the switch 228 may be disposed in a first state, a second state, and a third state. In the first state of the switch 228, the light source 201 may be electrically connected with a power supply (not shown) to switch the light source 201 to an on state. In the second state of the switch 228, the light source 201 may be electrically disconnected from the power supply to switch the light source 201 to an off state. Further, in the third state of the switch 228, the switch 228 may electrically connect the light source 201 with the power supply when a door of the operator cabin 106 (see FIG. 1) is open. Additionally, in the third state, the switch 228 may electrically disconnect the light source 201 from the power supply when the door of the operator cabin 106 is closed. In some examples, the switch 228 may include one or more markings on the first switch surface 242, the second switch surface 244, and the third switch surface 246 to notify the operator regarding the operating states of the switch 228. The markings may be printed, protruded, embossed or engraved, without any limitations. Alternatively, the markings may be provided on the intermediate portion 230 or the second raised surface 218, without any limitations.

Further, in some examples, the second surface 208 of each longitudinal portion 204, 205, the first lateral portion 210, the second lateral portion 216, the intermediate portion 230, and the switch 228 include a glossy surface finish. In some examples, a low gloss treatment may be performed on the second surface 208, the first lateral portion 210, the second lateral portion 216, the intermediate portion 230, and the switch 228. In an example, the second surface 208, the first lateral portion 210, the second lateral portion 216, the intermediate portion 230, and the switch 228 may have a matte finish. Moreover, in some examples, the first surface 206 of each longitudinal portion 204, 205 and the cover 226 includes a polished surface finish.

Figure 5:
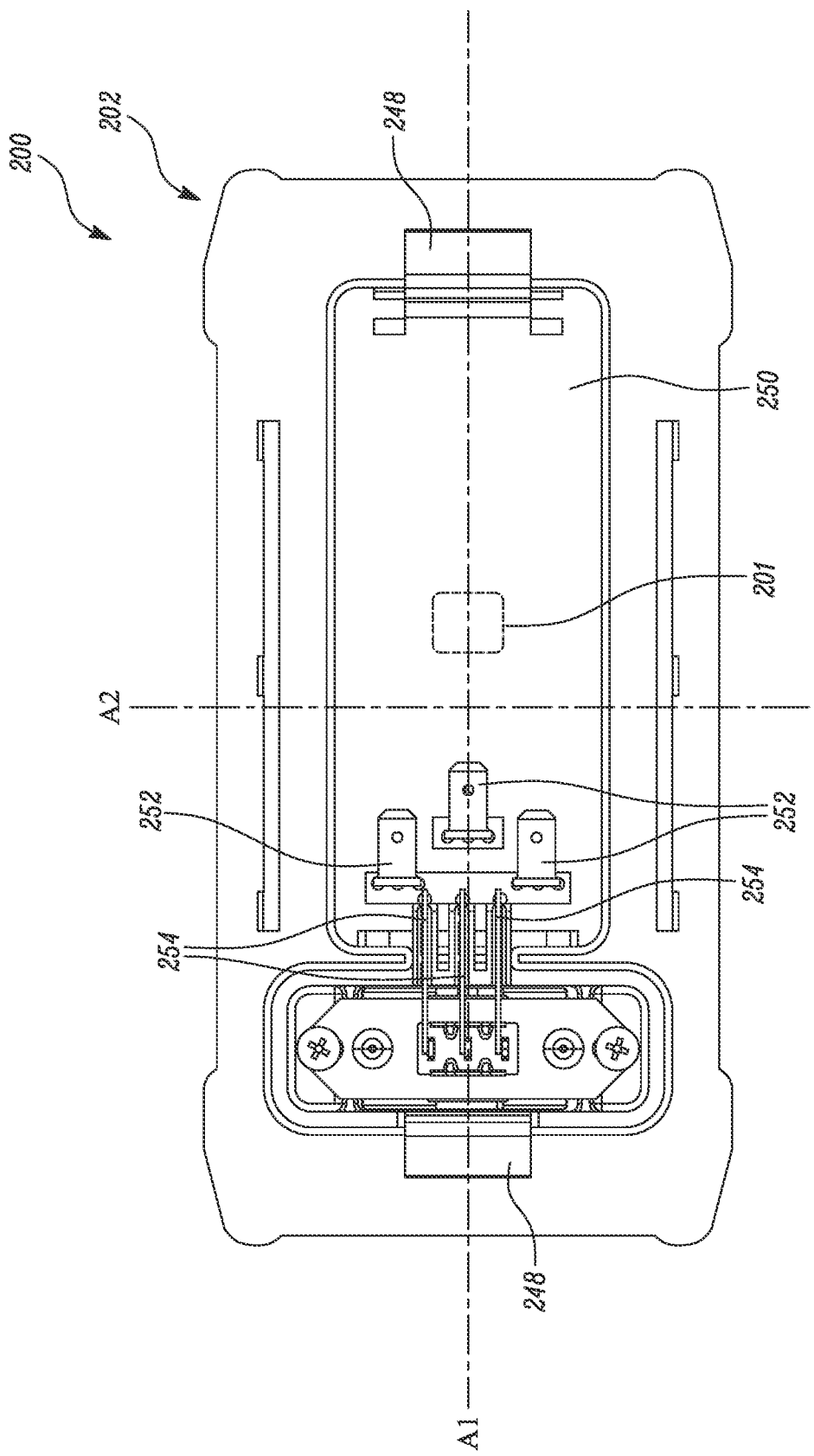
FIG. 5 is a rear view of the cabin light of FIG. 2.

Referring to FIG. 5, a schematic rear view of the cabin light 200 is illustrated. As illustrated in FIG. 5, the cabin light 200 includes one or more coupling elements 248. The coupling elements 248 may facilitate a coupling of the cabin light 200 with the operator cabin 106 (see FIG. 1). In another example, the coupling elements 248 may facilitate a coupling of the cabin light 200 with the adapter 300 (shown in FIGS. 6 and 7). The coupling elements 248 may include any type of coupling arrangement, such as, a latch, a clamp, a magnetic lock, a snap-fit arrangement, a click fit arrangement, or mechanical fasteners, such as, bolts, screws, pins, and the like. In an example, the clamp may be a spring-loaded clamp. In the illustrated example of FIG. 5, each coupling element 248 includes the clamp. It should be noted that the coupling elements 248 illustrated herein are exemplary in nature, and the coupling elements 248 may include any other design or size.

The cabin light 200 further includes a back housing 250. The back housing 250 may hold and support the light source 201. For exemplary purposes, the single light source 201 is schematically illustrated herein. Alternatively, a number of light sources similar to the light source 201 may be associated with the panel 202. It should be noted that the light source 201 may include any light emitting source, such as, a light emitting diode (LED) without any limitation. Further, the light source 201 may emit evenly distributed light in the operator cabin 106, The light source 201 may be colored or may otherwise possess different lighting characteristics, as per application requirements.

The light source 201 includes one or more electrical terminals 252 that may be electrically connected to the power supply. The electrical terminals 252 may establish an electrical connection between the light source 201 and the power supply. The cabin light 200 further includes one or more conductive elements 254 establishing an electrical connection between the one or more electrical terminals 252 and the switch 228 (see FIG. 4).

The switch 228 may electrically connect the one or more electrical terminals 252 of the light source 201 with the power supply in the first state of the switch 228, and may electrically disconnect the one or more electrical terminals 252 of the light source 201 from the power supply in the second state of the switch 228. Further, in the third state of the switch 228, the switch 228 may electrically connect the one or more electrical terminals 252 of the light source 201 with the power supply when the door of the operator cabin 106 is open. Also, in the third state of the switch 228, the switch 228 may electrically disconnect the one or more electrical terminals 252 of the light source 201 from the power supply when the door of the operator cabin 106 is closed. It should be noted that the details of the connection between the switch 228, the light source 201, the power supply, etc. as explained herein are exemplary in nature, and the cabin light 200 may include any other arrangement of components, without any limitations.

Figure 6:
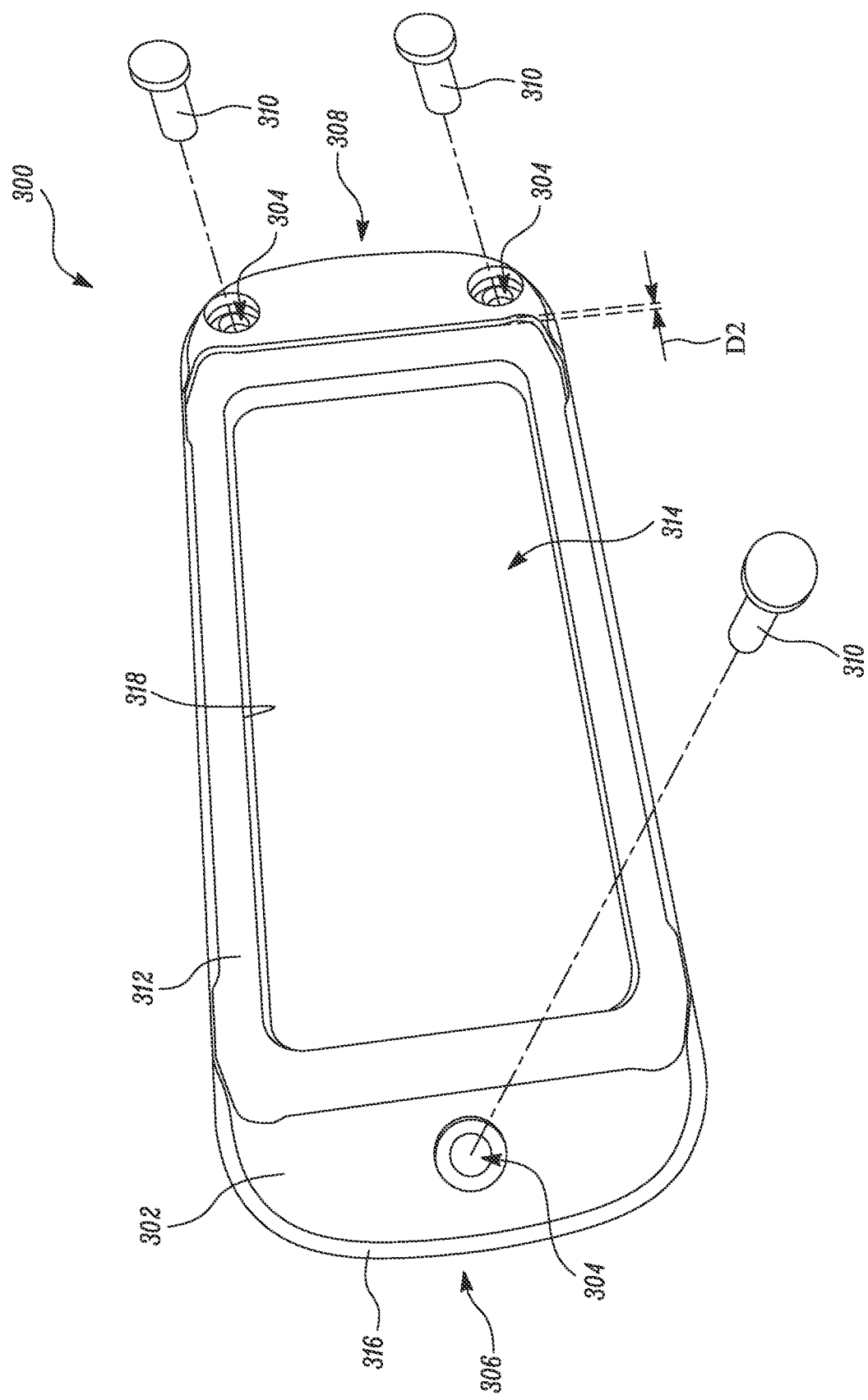
FIG. 6 is a perspective view of an adapter of a cabin light assembly associated with the machine of FIG. 1, according to an embodiment of the present disclosure.

Referring to FIG. 6, a perspective view of the adapter 300 is illustrated, in accordance with an embodiment of the present disclosure. The adapter 300 is removably coupled with the operator cabin 106 (see FIG. 1). The adapter 300 may be used to removably couple the cabin light 200 (see FIGS. 2 to 5) with the operator cabin 106. As illustrated in FIG. 6, the adapter 300 includes a first continuous surface 302 extending along an outer perimeter 316 of the adapter 300. The first continuous surface 302 defines two or more through-openings 304. In the illustrated example of FIG. 6, the first continuous surface 302 defines three through-openings 304. One of the through-opening 304 is defined at a first end 306 of the adapter 300. Further, two of the through-openings 304 are defined at a second end 308 of the adapter 300. However, in other examples, the first continuous surface 302 may define one through-opening 304 on each of the first end 306 and the second end 308 of the adapter 300.

Each of the two or more through-openings 304 receive a corresponding mechanical fastener 310 for removably coupling the adapter 300 with the operator cabin 106 of the machine 100. Further, the first continuous surface 302 includes a glossy surface finish. In some examples, a low gloss treatment may be performed on the first continuous surface 302. In an example, the first continuous surface 302 may have a matte finish. The adapter 300 further includes a second continuous surface 312 extending along an inner perimeter 318 of the adapter 300. The first continuous surface 302 is spaced apart from the second continuous surface 312. Specifically, a distance "D2" may be defined between the first continuous surface 302 and the second continuous surface 312. Further, the second continuous surface 312 includes a polished surface finish.

The adapter 300 further defines a central opening 314 that at least partially receives the cabin light 200 based on the coupling of the cabin light 200 with the adapter 300. Generally, a shape of the central opening 314 may be similar to a shape of the cabin light 200. The central opening 314 has a rectangular shape herein. Further, in an example, a size of the central opening 314 may be lesser than a size of the cabin light 200.

Figure 7:
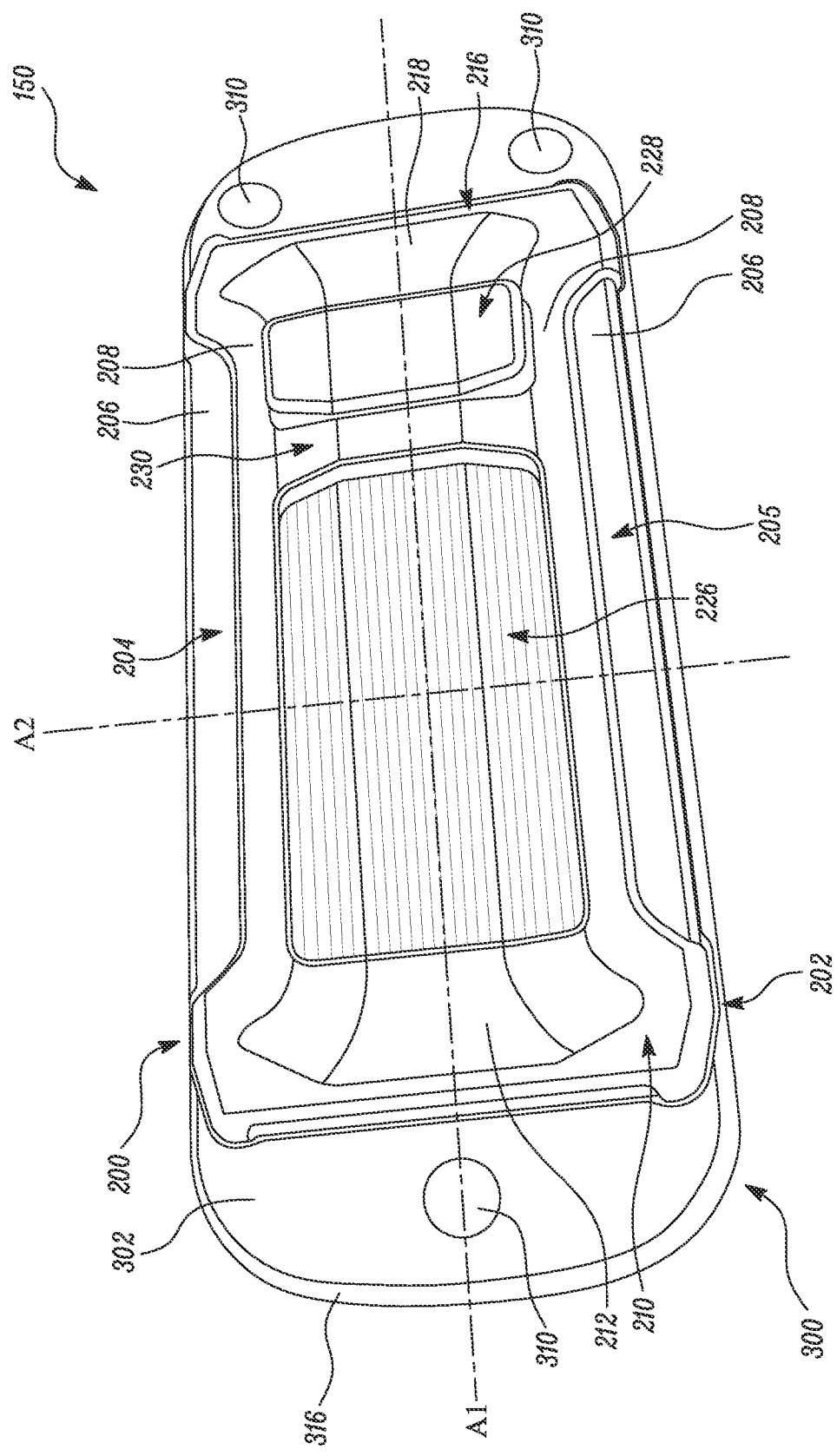
FIG. 7 is a perspective view illustrating the cabin light coupled to the adapter of FIG. 6.

Referring to FIG. 7, a schematic perspective view of the cabin light assembly 150 is illustrated. As illustrated, the cabin light 200 is removably coupled with the adapter 300. Further, the panel 202 contacts the second continuous surface 312 (see FIG. 6) based on the coupling of the cabin light 200 with the adapter 300. Furthermore, the coupling elements 248 (see FIG. 5) of the cabin light 200 may couple with the adapter 300 in order to secure the cabin light 200 with the adapter 300, In some examples, the coupling elements 248 may contact a surface of the adapter 300 that is opposite the second continuous surface 312 for coupling the cabin light 200 with the adapter 300.

INDUSTRIAL APPLICABILITY

The cabin light 200 described herein may be aesthetically appealing. For example, the glossy surface finish and the polished surface finish on various surfaces of the panel 202 may improve the aesthetics of the cabin light 200. Further, the cabin light assembly 150 described herein is embodied as a modular and retrofittable light assembly that may be removably coupled with different types of operator cabins and/or different mounting arrangement in operator cabins.

In some examples, the cabin light 200 may be directly coupled to the operator cabin 106 of the machine 100, via the one or more coupling elements 248. In other examples, the cabin light 200 may be removably coupled with the adapter 300, via the one or more coupling elements 248. The adapter 300 may be in turn coupled with the operator cabin 106 of the machine 100 using the mechanical fastener 310. Thus, the cabin light assembly 150 described herein may eliminate requirement of cabin lights having different designs and sizes, thereby reducing part numbers. Further, the cabin light 200 or the adapter 300 may be quickly and easily coupled with the operator cabin 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A cabin light for a machine, the cabin light comprising: a panel adapted to couple with a light source, the panel including: a pair of longitudinal portions extending along a longitudinal axis of the cabin light, each longitudinal portion including a first surface, a second surface at an offset from the first surface, and a first width, wherein the first surface defines a second width, such that the first width is greater than the second width by a factor of at least two; a first lateral portion extending between the pair of longitudinal portions along a lateral axis of the cabin light, the first lateral portion defining a first length along the longitudinal axis, wherein the first lateral portion includes a first raised surface extending along at least a portion of the first length; and a second lateral portion extending between the pair of longitudinal portions along the lateral axis of the cabin light, the second lateral portion being disposed opposite the first lateral portion, the second lateral portion defining a second length along the longitudinal axis, wherein the second lateral portion includes a second raised surface extending along at least a portion of the second length; a cover fixedly coupled to the panel, wherein the cover is in alignment with the light source, such that the cover allows passage of light emitted by the light source therethrough; and a switch between the cover and the second lateral portion of the panel in a longitudinal direction of the panel, wherein the panel further includes an intermediate portion between the cover and the switch in the longitudinal direction of the panel, wherein the cover includes a first cover surface, a second cover surface, and a third cover surface between the first cover surface and the second cover surface, each of the first, second, and third cover surfaces extending from the first side of the cover to the second side of the cover, each of the first cover surface and the second cover surface being inclined with respect to the third cover surface which is substantially planar, wherein the switch includes a first switch surface, a second switch surface, and a third switch surface extending between the first switch surface and the second switch surface, each of the first switch surface and the second switch surface being inclined with respect to the third switch surface which is substantially planar, and wherein, in the longitudinal direction of the panel, the first cover surface is aligned with the first switch surface, the second cover surface is aligned with the second switch surface, and the third cover surface is aligned with the third switch surface.

2. The cabin light of claim 1, wherein the cover extends between the first lateral portion and the intermediate portion, the cover defining a first side extending along the lateral axis and disposed adjacent to the first raised surface of the first lateral portion, such that the first side includes a plurality of first linear surfaces, the cover further defining a second side extending along the lateral axis and disposed adjacent to the intermediate portion, such that the second side includes a plurality of second linear surfaces.

3. The cabin light of claim 1, wherein the second surface of each longitudinal portion, the first lateral portion, the second lateral portion, the intermediate portion, and the switch include a glossy surface finish.

4. The cabin light of claim 1, wherein the first surface of each longitudinal portion and the cover includes a polished surface finish.

5. The cabin light of claim 1,
wherein the panel further includes a first side surface orthogonal to the first lateral portion,
wherein the panel further includes a second side surface orthogonal to the second lateral portion, such that the first side surface is substantially parallel to the second side surface, and
wherein each of the first side surface and the second side surface includes a polished surface finish.

6. The cabin light of claim 1,
wherein the cabin light is adapted to be removably coupled with an adapter, and
wherein the adapter is adapted to be removably coupled with an operator cabin of the machine, the adapter including:
a first continuous surface extending along an outer perimeter of the adapter; and
a second continuous surface extending along an inner perimeter of the adapter, the first continuous surface being spaced apart from the second continuous surface, the adapter defining a central opening that at least partially receives the cabin light based on a coupling of the cabin light with the adapter, wherein the panel is adapted to contact the second continuous surface based on the coupling of the cabin light with the adapter.

7. The cabin light of claim 6,
wherein the first continuous surface defines at least two through-openings, and
wherein each of the at least two through-openings receives a corresponding mechanical fastener fix removably coupling the adapter with the operator cabin of the machine.

8. The cabin light of claim 6,
wherein the first continuous surface includes a glossy surface finish, and
wherein the second continuous surface includes a polished surface finish.

9. The cabin light of claim 1,
wherein the first cover surface and the second cover surface are inclined in a first direction, from the third cover surface toward the panel, and
wherein the first switch surface and the second switch surface are inclined in a second direction, from the third switch surface away from the panel.

10. A cabin light assembly for a machine, the cabin light assembly comprising: a cabin light including: a panel adapted to couple with a light source, the panel including: a pair of longitudinal portions extending along a longitudinal axis of the cabin light, each longitudinal portion including a first surface, a second surface at an offset from the first surface, and a first width, wherein the first surface defines a second width, such that the first width is greater than the second width by a factor of at least two; a first lateral portion extending between the pair of longitudinal portions along a lateral axis of the cabin light, the first lateral portion defining a first length along the longitudinal axis, wherein the first lateral portion includes a first raised surface extending along at least a portion of the first length; and a second lateral portion extending between the pair of longitudinal portions along the lateral axis of the cabin light, the second lateral portion being disposed opposite the first lateral portion, the second lateral portion defining a second length along the longitudinal axis, wherein the second lateral portion includes a second raised surface extending along at least a portion of the second length; a cover fixedly coupled to the panel, wherein the cover is in alignment with the light source, such that the cover allows passage of light emitted by the light source therethrough, wherein the cover includes a first cover surface, a second cover surface, and a third cover surface between the first cover surface and the second cover surface, each of the first, second, and third cover surfaces extending from the first side of the cover to the second side of the cover, each of the first cover surface and the second cover surface being inclined with respect to the third cover surface which is substantially planar; and a switch between the cover and the second lateral portion of the panel, wherein the switch includes a first switch surface, a second switch surface, and a third switch surface extending between the first switch surface and the second switch surface, each of the first switch surface and the second switch surface being inclined with respect to the third switch surface which is substantially planar, and wherein, in the longitudinal direction of the panel, the first cover surface is aligned with the first switch surface, the second cover surface is aligned with the second switch surface, and the third cover surface is aligned with the third switch surface; and an adapter adapted to be removably coupled with an operator cabin of the machine, wherein the cabin light is adapted to be removably coupled with the adapter, the adapter including: a first continuous surface extending along an outer perimeter of the adapter; and a second continuous surface extending along an inner perimeter of the adapter, the first continuous surface being spaced apart from the second continuous surface, the adapter defining a central opening that at least partially receives the cabin light based on a coupling of the cabin light with the adapter, wherein the panel is adapted to contact the second continuous surface based on the coupling of the cabin light with the adapter, wherein the switch is operative in three states, a first state to electrically connect a power supply to the light source, a second state to electrically disconnect the power supply from the light source, and a third state to electrically connect the power supply to the light source when a door of an operator cabin is open and electrically disconnect the power supply from the light source when the door of the operator cabin is closed.

11. The cabin light assembly of claim 10, wherein the panel further includes an intermediate portion between the cover and the switch.

12. The cabin light assembly of claim 11, wherein the cover extends between the first lateral portion and the intermediate portion, the cover defining a first side extending along the lateral axis and adjacent to the first raised surface of the first lateral portion, such that the first side includes a plurality of first linear surfaces, the cover further defining a second side extending along the lateral axis and adjacent to the intermediate portion, such that the second side includes a plurality of second linear surfaces.

13. The cabin light assembly of claim 11, wherein the second surface of each longitudinal portion, the first lateral portion, the second lateral portion, the intermediate portion, and the switch include a glossy surface finish.

14. The cabin light assembly of claim 10, wherein the first surface of each longitudinal portion and the cover includes a polished surface finish.

15. The cabin light assembly of claim 10,
wherein the panel further includes a first side surface extending orthogonally from the first lateral portion and a second side surface extending orthogonally from the second lateral portion, such that the first side surface is substantially parallel to the second side surface, and
wherein each of the first side surface and the second side surface includes a polished surface finish.

16. The cabin light assembly of claim 10,
wherein the first continuous surface includes a glossy surface finish, and
wherein the second continuous surface includes a polished surface finish.

17. The cabin light assembly of claim 10,
wherein the first cover surface and the second cover surface are inclined in a first direction, from the third cover surface toward the panel, and
wherein the first switch surface and the second switch surface are inclined in a second direction, from the third switch surface away from the panel.

* * * * *